US012684111B2

(12) United States Patent
Chae et al.

(10) Patent No.: US 12,684,111 B2
(45) Date of Patent: Jul. 14, 2026

(54) DEVICE AND SYSTEM FOR TESTING CAMERA IN HIGH AND LOW TEMPERATURE ENVIRONMENTS

(71) Applicant: SHANGHAI YANDING TECH CO., LTD, Shanghai (CN)

(72) Inventors: Jeongkeun Chae, Shanghai (CN); Qingchun Wang, Shanghai (CN)

(73) Assignee: SHANGHAI YANDING TECH CO., LTD, Shanghai (CN)

( * ) Notice: Subject to any disclaimer, the term of this patent is extended or adjusted under 35 U.S.C. 154(b) by 286 days.

(21) Appl. No.: 18/395,754

(22) Filed: Dec. 26, 2023

(65) Prior Publication Data

US 2024/0137485 A1 Apr. 25, 2024
US 2024/0236294 A9 Jul. 11, 2024

Related U.S. Application Data

(63) Continuation of application No. PCT/CN2023/117524, filed on Sep. 7, 2023.

(30) Foreign Application Priority Data

Jul. 7, 2022 (CN) .......................... 202210793396.4

(51) Int. Cl.
*H04N 17/00* (2006.01)
*G01M 11/02* (2006.01)
(Continued)

(52) U.S. Cl.
CPC ...... *H04N 17/002* (2013.01); *G01M 11/0207* (2013.01); *G01D 18/00* (2013.01);
(Continued)

(58) Field of Classification Search
CPC ................ H04N 17/002; G01M 11/00; G01M 11/0207; G01M 11/04; G01M 99/008;
(Continued)

(56) References Cited

U.S. PATENT DOCUMENTS

2013/0015354 A1 1/2013 Diamond
2018/0321131 A1* 11/2018 Supp ....................... F25B 39/02
(Continued)

FOREIGN PATENT DOCUMENTS

CN 207735013 U 8/2018
CN 209861063 U * 12/2019 ............. H04N 17/00
(Continued)

*Primary Examiner* — Benjamin R Schmitt
(74) *Attorney, Agent, or Firm* — Bayramoglu Law Offices LLC

(57) ABSTRACT

A device and system for testing a camera in high and low temperature environments. The device includes: a high and low temperature cabinet, a parallel light tube component, a test piece, a test box, a first positioning table, and a second positioning table, where the high and low temperature cabinet is connected to the test box, the test box is arranged on the first positioning table, the test piece is arranged in the parallel light tube component, the parallel light tube component is arranged on the second positioning table, and the parallel light tube component and the test box are arranged opposite to each other. The system includes: an image acquisition card, a display module, and an analysis module, where the image acquisition card is electrically connected to a camera module to be detected, the display module, and the analysis module for performing performance detection on the camera module.

15 Claims, 4 Drawing Sheets

(51) Int. Cl.

| | |
|---|---|
| *G01D 18/00* | (2006.01) |
| *G01D 21/00* | (2006.01) |
| *G01M 11/04* | (2006.01) |
| *G01M 99/00* | (2011.01) |
| *G01N 21/01* | (2006.01) |
| *G01N 21/84* | (2006.01) |

(52) U.S. Cl.
CPC ............. *G01D 21/00* (2013.01); *G01M 11/04* (2013.01); *G01M 99/008* (2013.01); *G01N 21/01* (2013.01); *G01N 21/84* (2013.01)

(58) Field of Classification Search
CPC ........ G01N 21/01; G01N 21/84; G01D 18/00; G01D 21/00
See application file for complete search history.

(56) References Cited

U.S. PATENT DOCUMENTS

| | | | |
|---|---|---|---|
| 2020/0084436 A1 | 3/2020 | Patterson | |
| 2021/0011075 A1 | 1/2021 | Zou | |

FOREIGN PATENT DOCUMENTS

| | | | | | |
|---|---|---|---|---|---|
| CN | 112866681 A | | 5/2021 | | |
| CN | 113301328 A | * | 8/2021 | ........... | H04N 17/002 |
| CN | 113691798 A | | 11/2021 | | |
| CN | 113691802 A | | 11/2021 | | |
| CN | 114205576 A | | 3/2022 | | |
| CN | 115174894 A | | 10/2022 | | |
| KR | 100965187 B1 | | 6/2010 | | |
| WO | 2021184733 A1 | | 9/2021 | | |

* cited by examiner

DEVICE AND SYSTEM FOR TESTING CAMERA IN HIGH AND LOW TEMPERATURE ENVIRONMENTS

CROSS REFERENCE TO RELATED APPLICATIONS

This application is a continuation application of International Application No. PCT/CN2023/117524, filed on Sep. 7, 2023, which is based on and claims foreign priority to Chinese patent application No. 202210793396.4 filed on Jul. 7, 2022, the entire contents of which are incorporated herein by reference.

TECHNICAL FIELD

This application belongs to the technical field of camera detection, and in particular to a device and system for testing a camera in high and low temperature environments.

BACKGROUND

With the rapid development of electronic equipment, a camera module is also applied to various scenes of life, for example, mobile phone consumption, road security and protection, unmanned driving, and the like. Application of the camera module to the above scenes asks for high requirement on stability of a camera, so whether the camera can operate normally is a very important link in reliability and stability tests of the camera, particularly in an extreme environment such as an extreme cold environment or an extreme hot environment.

In existing techniques for testing the camera in high and low temperature environments, a camera to be detected is usually put in a thermostatic chamber, the temperature needed for test is set, and after the camera to be detected is put in the thermostatic chamber for a period of time and the temperature is stabilized, the camera is taken out and is put in a room temperature environment for testing whether the camera can operate normally. This test mode only can verify whether the camera can operate after being subjected to the high and low temperature environments actually, but cannot truly test whether the camera can operate normally in the high and low temperature environments. Therefore, it is an urgent need to propose a device for testing a camera in high and low temperature environments, which can detect the performance of the camera in the high and low temperature environments in real time, thereby ensuring the quality of the camera and enhancing the using experience of the electronic equipment.

SUMMARY

To overcome shortcomings or defects in the above prior art, technical problems to be solved in this application are to provide a device and system for testing a camera in high and low temperature environments.

To solve the above technical problems, this application is achieved by the following technical solution:

This application provides a device for testing a camera in high and low temperature environments, including: a high and low temperature cabinet, a parallel light tube component, a test piece, a test box, a first positioning table, and a second positioning table, where a heating tube and a refrigerating tube of the high and low temperature cabinet are respectively connected to the test box, the test box is arranged on the first positioning table, the test piece is arranged in the parallel light tube component, the parallel light tube component is arranged on the second positioning table, and the parallel light tube component and the test box are arranged opposite to each other.

Further, the device for testing a camera in high and low temperature environments is provided, where the first positioning table includes: a platform, a first sliding component, a second sliding component, and a first rotating component, where the first sliding component is arranged on the platform, the second sliding component is arranged on the first sliding component, the first rotating component is arranged on the second sliding component, and the test box is arranged on the first rotating component.

Further, the device for testing a camera in high and low temperature environments is provided, where the second positioning table includes: a third sliding component and a second rotating component. The second rotating component is arranged on the third sliding component, and the parallel light tube component is connected to the second rotating component.

Further, the device for testing a camera in high and low temperature environments is provided, where sliding directions of the first sliding component, the second sliding component, and the third sliding component are perpendicular to one another.

Further, the device for testing a camera in high and low temperature environments is provided, where the test box includes: a box body, a cover body, and a camera clamp. The box body and the cover body are arranged in a folding manner, and the camera clamp is arranged in the box body.

Further, the device for testing a camera in high and low temperature environments is provided, further including: a temperature sensor arranged in the box body.

Further, the device for testing a camera in high and low temperature environments is provided, where a glass window is arranged on the cover body, and a heating wire is arranged at the glass window.

Further, the device for testing a camera in high and low temperature environments is provided, further including: a shell, where the high and low temperature cabinet, the parallel light tube component, the test box, the first positioning table, and the second positioning table all are arranged in the shell.

Further, the device for testing a camera in high and low temperature environments is provided, where the test piece includes: a graphic card.

This application also provides a system based on the device for testing a camera in high and low temperature environments, including: an image acquisition card, a display module, and an analysis module, where the image acquisition card is electrically connected to a camera module to be detected, the display module, and the analysis module; and the image acquisition card converts an image of the test piece shot by the camera module to be detected into an electrical signal and transmits the electrical signal to the display module and the analysis module.

Compared with the prior art, this application has the following technical effects:

In this application, the high and low temperature cabinet provides the test piece with different test environment temperatures, so that the camera module to be detected is at different test temperatures, and performance detection is performed on the camera module to be detected actually to acquire an accurate test result and ensure the product quality of the camera module.

BRIEF DESCRIPTION OF THE DRAWINGS

Other features, objectives, and advantages of this application will become more apparent by reading the detailed description on non-limiting embodiments made with reference to the following drawings.

Figure 1:
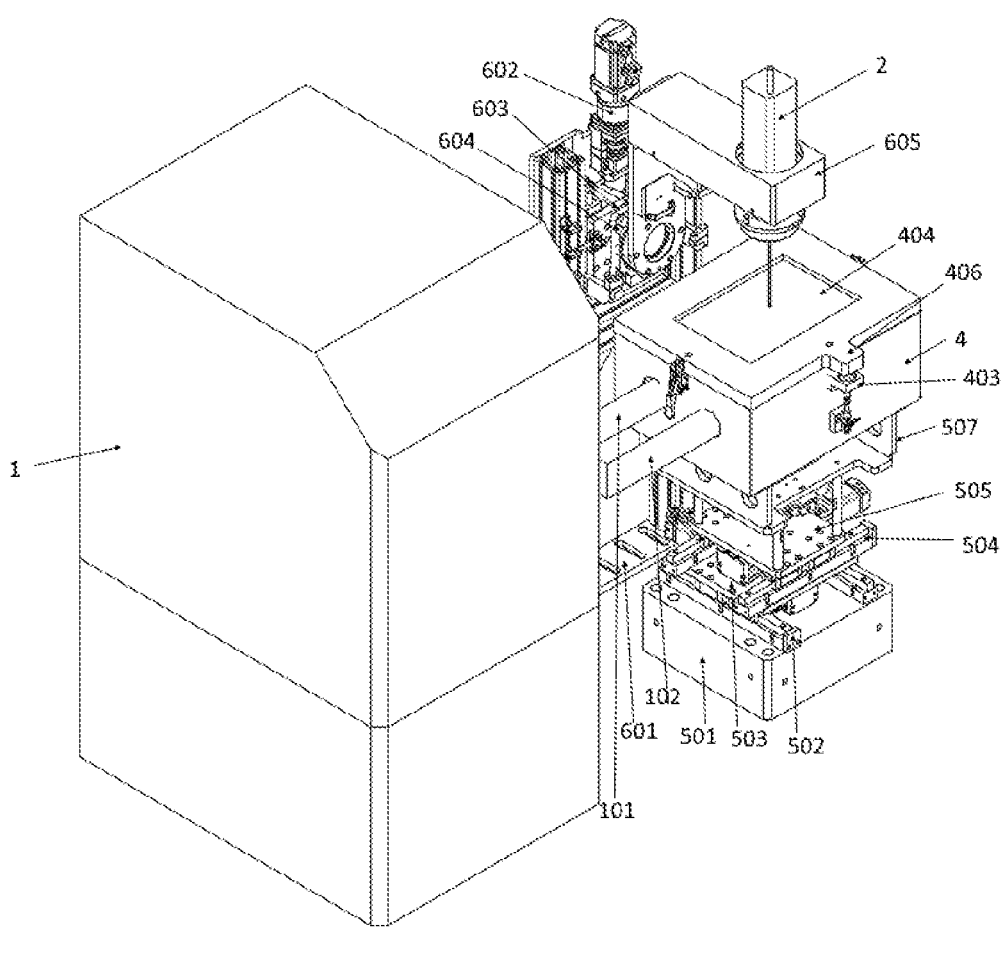
FIG. 1 is a schematic structural diagram of a device for testing a camera in high and low temperature environments in an embodiment of this application.
Figure 2:
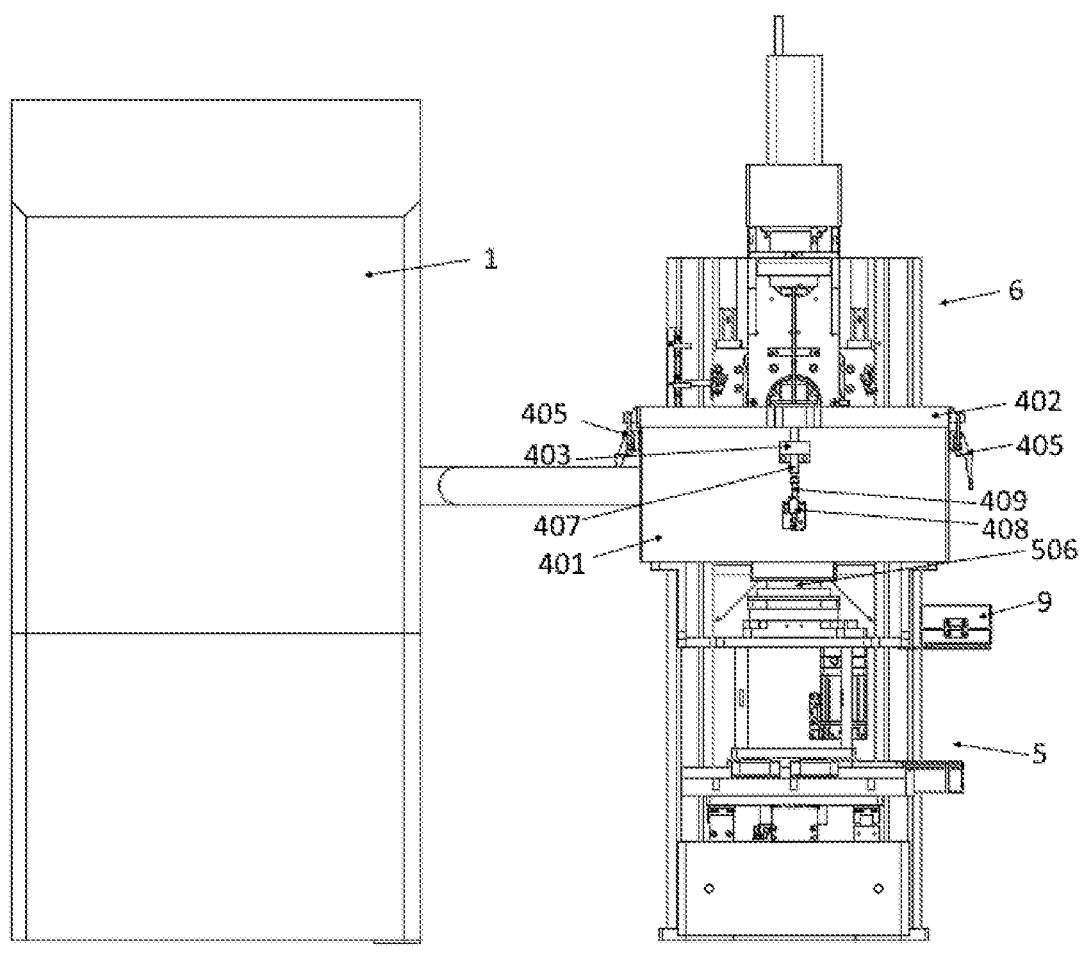
FIG. 2 is a front view of the structure shown in FIG. 1.
Figure 3:
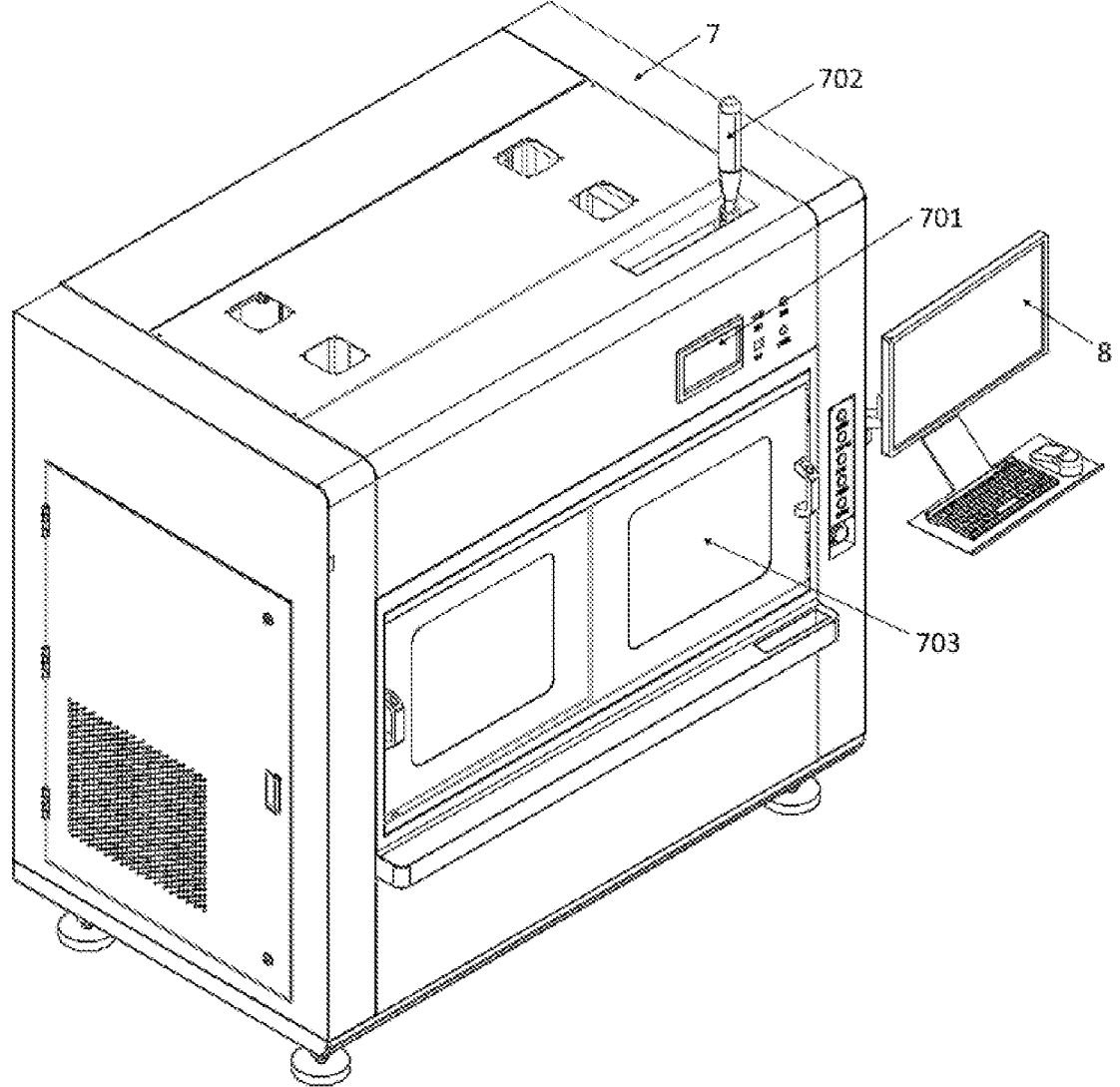
FIG. 3 is a schematic structural diagram of a device for testing a camera in high and low temperature environments arranged in a shell in an embodiment of this application.
Figure 4:
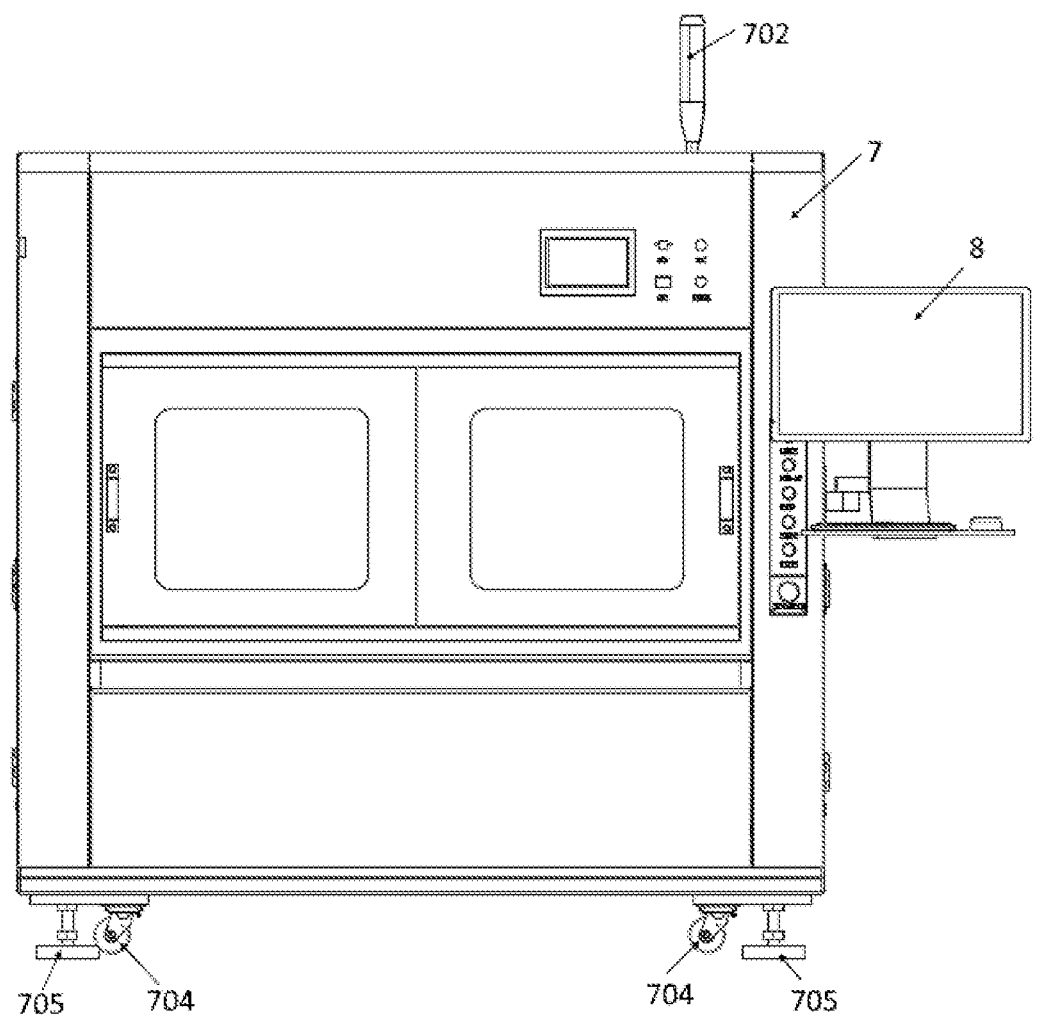
FIG. 4 is a front view of the structure shown in FIG. 3.
Figure 5:
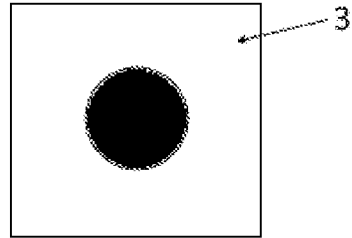
FIG. 5 is a schematic structural diagram of a test piece in an embodiment of this application.

In the drawings: 1—high and low temperature cabinet; 101—heating tube; 102—refrigerating tube; 2—parallel light tube component; 3—test piece; 4—test box; 401—box body; 402—cover body; 403—support table; 404—glass window; 405—fastener; 406—support base; 407—support rod; 408—push-up base; 409—push rod; 5—first positioning table; 501—platform; 502—X-axis slide rail; 503—first slide block; 504—Y-axis slide rail; 505—second slide block; 506—first rotating component; 507—mounting stand; 6—second positioning table; 601—mounting bracket; 602—Z axis slide rail; 603—third slide block; 604—second rotating component; 605—connector; 7—shell; 701—operation panel; 702—tri-color light; 703—operation window; 704—universal wheel; 705—hoof; 8—display module; and 9—image acquisition card.

DETAILED DESCRIPTION OF THE EMBODIMENTS

The technical solutions in embodiments of this application are clearly and completely described in the following with reference to the accompanying drawings in the embodiments of this application. Apparently, the described embodiments are merely some rather than all of the embodiments of this application. All other embodiments obtained by those of ordinary skill in the art based on the embodiments of this application without creative efforts shall fall within the protection scope of this application.

As shown in FIG. 1, provided is a device for testing a camera in high and low temperature environments in one of embodiments of this application, including: a high and low temperature cabinet 1, a parallel light tube component 2, a test piece 3, a test box 4, a first positioning table 5, and a second positioning table 6. A heating tube 101 and a refrigerating tube 102 of the high and low temperature cabinet 1 are respectively connected to the test box 4, the test box 4 is arranged on the first positioning table 5, the test piece 3 is arranged in the parallel light tube component 2, the parallel light tube component 2 is arranged on the second positioning table 6, and the parallel light tube component 2 and the test box 4 are arranged opposite to each other.

In the embodiment, the heating tube 101 and a refrigerating tube 102 of the high and low temperature cabinet 1 are respectively connected to the test box 4 to provide the test box 4 with a test environment temperature; the test box 4 is arranged on the first positioning table 5, and the camera module to be detected is placed in the test box 4; and the test piece 3 is arranged in the parallel light tube component 2, the parallel light tube component 2 is arranged on the second positioning table 6, and the parallel light tube component 2 and the test box 4 are arranged opposite to each other; and positions of the parallel light tube component 2 and the test box 4 are respectively adjusted by the first positioning table 5 and the second positioning table 6, so that the center of the parallel light tube component 2 corresponds to the center of the camera module to be detected which facilitates the camera module to be detected to shoot the test piece 3 for its performance analysis. Through the above arrangements, the heating tube 101 and the refrigerating tube 102 of the high and low temperature cabinet 1 adjust the temperature in the test box 4, so that the camera module to be detected is at different test temperatures, and performance detection is performed on the camera module to be detected actually to acquire an accurate test result and ensure the product quality of the camera module.

Optionally, the test piece 3 includes, but not limited to a graphic card; the graphic card includes: a card provided with checkerboard pattern or a card provided with a round pattern, and the like. Those skilled in the art may select the pattern of the graphic card according to an actual test requirement.

Specifically, the device for testing a camera in high and low temperature environments further includes: a shell 7. The high and low temperature cabinet 1, the parallel light tube component 2, the test box 4, the first positioning table 5, and the second positioning table 6 all are arranged in the shell 7. Through the above arrangements, it is favorable to protect the device for testing a camera in high and low temperature environments, so as to prevent the equipment in the shell 7 from bumping, and meanwhile, the above components are integrated for the convenience of carrying, so that the applicable scene of the device for testing a camera in high and low temperature environments can be expanded.

Specifically, an operation panel 701 is arranged on the shell 7 for a worker to check the operation condition of the device for testing a camera in high and low temperature environments conveniently.

Specifically, a tri-color light 702 is arranged on the shell 7 for signal alarm of the device for testing a camera in high and low temperature environments, for example, alarm for a problematic signal.

Specifically, an operation window 703 is also arranged on the shell 7 for the worker to observe and operate conveniently; and the operation window 703 is opened in a push-pull mode, which, compared with a flat push opening mode, is more favorable to save space.

Specifically, universal wheels 704 and/or hooves 705 are arranged under the shell 7 for shifting or placing the device for testing a camera in high and low temperature environments conveniently.

Optionally, the high and low temperature cabinet 1 can provide a test environment at −60° C.-150° C.; the high and low temperature cabinet 1 includes: a heating mechanism and a refrigerating mechanism. The heating mechanism is connected to the test box 4 through the heating tube 101, and the refrigerating mechanism is connected to the test box 4 through the refrigerating tube 102.

Optionally, the heating mechanism includes, but not limited to the heating tube. The heating tube includes: a finned radiating tube or a U-shaped radiating tube.

Optionally, the refrigerating mechanism includes, but not limited to a compressor or a condenser.

Specifically, the first positioning table 5 includes: a platform 501, a first sliding component, a second sliding component, and a first rotating component 506. The first sliding component is arranged on the platform 501, the second sliding component is arranged on the first sliding component, the first rotating component 506 is arranged on the second sliding component, and the test box 4 is arranged on the first rotating component 506.

In the embodiment, the first sliding component includes: a Y-axis slide rail 504 and a first slide block 503. The Y-axis slide rail 504 is arranged on the platform 501, and the first slide block 503 is slidably arranged on the Y-axis slide rail 504. The second sliding component includes: an X-axis slide rail 502 and a second slide block 505. The X-axis slide rail 502 is arranged on the first slide block 503, and the second slide block 505 is slidably arranged on the X-axis slide rail 502; the first rotating component 506 is arranged on the second slide block 505, and a rotation axis of the first rotating component 506 is arranged to be perpendicular to the X-axis slide rail 502 and the Y-axis slide rail 504; and the test box 4 is mounted on the first rotating component 506 through a mounting stand 507, and the first positioning table 5 drives the test box 4 to slide in an X-axis direction and a Y-axis direction and rotate around a Z-axis direction to adjust the position of the test box 4, so as to adjust the position of the camera module to be detected.

Specifically, the platform 501 is made of a marble material. The test accuracy is guaranteed by means of the characteristic that the surface of the marble is flat.

Specifically, the second positioning table 6 includes: a third sliding component and a second rotating component 604. The second rotating component 604 is arranged on the third sliding component, and the parallel light tube component 2 is connected to the second rotating component 604.

In the embodiment, the second positioning table 6 is arranged on a mounting bracket 601, and the third sliding component includes: a Z-axis slide rail 602 and a third slide block 603. The Z-axis slide rail 602 is connected to the mounting bracket 601, and the third slide block 603 is slidably arranged on the Z-axis slide rail 602; the second rotating component 604 is arranged on the third slide block 603; the parallel light tube component 2 is connected to the second rotating component 604 through a connector 605; and a rotation axis of the second rotating component 604 is arranged to be perpendicular to the Z-axis slide rail 602. The second positioning table 6 drives the parallel light tube component 2 to slide in the Z-axis direction and rotate around the X-axis direction to adjust the position of the parallel light tube component 2 or perform a wide-angle test of the camera module to be detected or perform a focusing test of the camera module to be detected.

Specifically, the test box 4 includes: a box body 401, a cover body 402, and a camera clamp. The box body 401 and the cover body 402 are arranged in a folding manner, and the camera clamp is arranged in the box body 401. The camera module to be detected is arranged on the camera clamp, and the box body 401 and the cover body 402 provide the camera module to be detected with a closed environment, so as to ensure the stability of the test environment temperature.

Specifically, a sealing strip is arranged between the box body 401 and the cover body 402 to further enhance the tightness of the test box 4.

Specifically, a glass window 404 is arranged on the cover body 402 for the camera module to be detected to shoot test piece 3 conveniently.

Optionally, double-layer glass is used for the glass window 404, and a heating wire is arranged between glass interlayers to effectively eliminate mist generated on the glass window 404, so as to prevent detection from being interfered by temperature change in the test box 4.

Specifically, the test box 4 further includes: a rotary opening and closing piece and at least two groups of fasteners 405. The two groups of fasteners 405 are oppositely connected to the box body 401 and the cover body 402, and the rotary opening and closing piece is arranged to be adjacent to the fasteners 405 and is connected to the box body 401 and the cover body 402.

In the embodiment, one end of the fastener 405 is arranged on the cover body 402, the other end of the fastener 405 is arranged on the box body 401, and the fastener 405 connects the cover body 402 and the box body 401; and the rotary opening and closing piece includes: a support base 406, a support rod 407, a push-up base 408, a push rod 409, and a support table 403. The support base 406 and the cover body 402 are integrally arranged, the support rod 407 is arranged on the support base 406, the support table 403 and the push-up base 408 are respectively connected to the box body 401, the push rod 409 is connected to the push-up base 408 and corresponds to the support rod 407, and the support table 403 and the push rod 409 are coaxially arranged. In the embodiment, when it is needed to open the test box 4, the fasteners 405 are opened to push up the push-up base 408, so that the push rod 409 moves upwards and is connected to the support rod 407 to jack the cover body 402. The cover body 402 is manually rotated, so that the cover body 402 rotates by 180° by taking the support rod 407 as a rotation center, and the cover body 402 falls and is supported by the support table 403 to open the test box 4; and when it is needed to close the test box 4, an inverse process of the above opening process is adopted to close the test box 4.

Specifically, the device for testing a camera in high and low temperature environments further includes: a temperature sensor. The temperature sensor is arranged in the box body 401 for monitoring the temperature in the box body 401, so as to ensure the accuracy of a detection result.

This application also provides a system based on the device for testing a camera in high and low temperature environments, including: an image acquisition card 9, a display module 8, and an analysis module. The image acquisition card 9 is electrically connected to a camera module to be detected, the display module 8, and the analysis module; the image acquisition card 9 converts an image of a test piece 3 shot by the camera module to be detected into an electrical signal and transmits the electrical signal to the display module 8 and the analysis module; the electrical signal is transmitted to the display module 8 for the worker to observe shooting imaging of the camera module to be detected and is transmitted to the analysis module for performance parameter analysis to obtain an analysis result; the analysis module is electrically connected to the display module 8; and the analysis module transmits the analysis result to the display module 8 for the worker to acquire an analysis result.

Optionally, the display module 8 includes, but not limited to a display screen.

Specifically, the system further includes: a control module. The control module is electrically connected to the high and low temperature cabinet 1, the first positioning table 5, the second positioning table 6, the temperature sensor, the display module 8, and the analysis module, respectively; the control module controls the high and low temperature cabinet 1 to provide the test environment temperature and monitor the test environment temperature through the temperature sensor; the analysis module analyzes image information shot by the camera module to be detected and acquired by the image acquisition card 9 to determine whether the center of the camera module to be detected and the center of the parallel light tube component 2 are on a same straight line first, which specifically refers to that the test piece 3 with the round pattern in the middle of the card is selected and arranged in the parallel light tube component 2; the round pattern overlaps with the center of the parallel light tube component 2, the camera to be detected shoots the test piece 3, and the image is transmitted by the image acquisition card 9 to the analysis module; the analysis module analyzes whether the center of the camera module to be detected and the center of the parallel light tube component 2 are on the same straight line according to obtained information; if the center of the camera module to be detected and the center of the parallel light tube component are not on the same straight line, deviation information is transferred to the control module; and the control module then adjusts the position of the first positioning table 5 or the second positioning table 6, and the first positioning table 5 may be set immobile while the second positioning table 6 is adjusted, or the second positioning table 6 may be set immobile while the first positioning table 5 is adjusted; and the test piece 3 is replaced according to a detection requirement on the camera module to be detected; the camera to be detected shoots the test piece 3, the shot image is transferred to the image acquisition card 9 and is converted by the image acquisition card 9 into an electrical signal which is transferred to the analysis module; and the analysis module analyzes related parameters, evaluates the performance of the camera module to be detected, and transmits an analysis result to the display module 8 for the worker to acquire.

In this application, the high and low temperature cabinet 1 provides the test box 4 with different test environment temperatures, so that the camera module to be detected is at different test temperatures, and performance detection is performed on the camera module to be detected actually to acquire an accurate test result and ensure the product quality of the camera module.

In the description of this application, unless otherwise explicitly specified or defined, the terms "connect", "connection", and "fix" should be understood in a broad sense. For example, the connection may be a fixed connection, a detachable connection, or an integral connection; or the connection may be a mechanical connection or an electrical connection; or the connection may be a direct connection, an indirect connection through an intermediate medium, internal communication between two components, or an interaction relationship between two components. Those of ordinary skill in the art may understand the specific meanings of the foregoing terms in this application according to specific situations.

In this application, unless otherwise explicitly specified and defined, the first feature is "on" or "below" the second feature, which may either include direct contact of the first feature and the second feature or include indirect contact of the first feature and the second feature but contact through other features therebetween. In addition, the first feature is "on", "above", and "over" the second feature, which includes that the first feature is right above and on the inclined top of the second feature or merely indicates that a level of the first feature is higher than that of the second feature. The first feature is "below", "under", and "beneath" the second feature, which includes that the first feature is right below and obliquely below the second feature or merely indicates that a level of the first feature is lower than that of the second feature.

In the description of the embodiment, orientation or position relationships indicated by the terms "upper", "lower", "left", "right" and etc. are based on orientation or position relations shown in the drawings and are only used for convenient description and simplification of operations rather than indicating or implying that the indicated devices or components must have specific orientations and are configured and operated in the specific orientations. Therefore, it cannot be construed as limitations to this application. In addition, the terms "first" and "second" are merely used for distinguishment in description rather than having special meaning.

The above embodiments are merely used for describing the technical solution of this application rather than limiting this application, and this application is described in detail with reference to preferred embodiments. Those of ordinary skill in the art should understand that modifications or equivalent substitutions on the technical solution of this application without departing from the spirit and scope of the technical solution of this application all should fall within the scope of the claims of this application.

What is claimed is:

1. A device for testing a camera in high and low temperature environments, comprising: a high and low temperature cabinet, a parallel light tube component, a test piece, a test box, a first positioning table, and a second positioning table, wherein a heating tube and a refrigerating tube of the high and low temperature cabinet are respectively connected to the test box, the test box is arranged on the first positioning table, the test piece is arranged in the parallel light tube component, the parallel light tube component is arranged on the second positioning table, and the parallel light tube component and the test box are arranged opposite to each other, wherein the first positioning table comprises: a platform, a first sliding component, a second sliding component, and a first rotating component, wherein the first sliding component is arranged on the platform, the second sliding component is arranged on the first sliding component, the first rotating component is arranged on the second sliding component, and the test box is arranged on the first rotating component.

2. The device for testing a camera in high and low temperature environments according to claim 1, wherein the second positioning table comprises: a third sliding component and a second rotating component, the second rotating component being arranged on the third sliding component, and the parallel light tube component being connected to the second rotating component.

3. The device for testing a camera in high and low temperature environments according to claim 2, wherein sliding directions of the first sliding component, the second sliding component, and the third sliding component are perpendicular to one another.

4. The device for testing a camera in high and low temperature environments according to claim 3, wherein the test box comprises: a box body, a cover body, and a camera clamp, the box body and the cover body being arranged in a folding manner, and the camera clamp being arranged in the box body.

5. The device for testing a camera in high and low temperature environments according to claim 3, further comprising: a shell, wherein the high and low temperature cabinet, the parallel light tube component, the test box, the first positioning table, and the second positioning table all are arranged in the shell.

6. The device for testing a camera in high and low temperature environments according to claim 3, wherein the test piece comprises: a graphic card.

7. The device for testing a camera in high and low temperature environments according to claim 2, wherein the test box comprises: a box body, a cover body, and a camera clamp, the box body and the cover body being arranged in a folding manner, and the camera clamp being arranged in the box body.

8. The device for testing a camera in high and low temperature environments according to claim 2, further comprising: a shell, wherein the high and low temperature cabinet, the parallel light tube component, the test box, the first positioning table, and the second positioning table all are arranged in the shell.

9. The device for testing a camera in high and low temperature environments according to claim 2, wherein the test piece comprises: a graphic card.

10. The device for testing a camera in high and low temperature environments according to claim 1, wherein the test box comprises: a box body, a cover body, and a camera clamp, the box body and the cover body being arranged in a folding manner, and the camera clamp being arranged in the box body.

11. The device for testing a camera in high and low temperature environments according to claim 10, further comprising: a temperature sensor arranged in the box body.

12. The device for testing a camera in high and low temperature environments according to claim 1, further comprising: a shell, wherein the high and low temperature cabinet, the parallel light tube component, the test box, the first positioning table, and the second positioning table all are arranged in the shell.

13. The device for testing a camera in high and low temperature environments according to claim 1, wherein the test piece comprises: a graphic card.

14. A system based on the device for testing a camera in high and low temperature environments according to claim 1, comprising: an image acquisition card, a display module, and an analysis module, wherein the image acquisition card is electrically connected to a camera module to be detected, the display module, and the analysis module; the image acquisition card converts an image of the test piece shot by the camera module to be detected into an electrical signal and transmits the electrical signal to the display module and the analysis module; the analysis module is electrically connected to the display module; and the analysis module analyzes the received electrical signal and transmits an analysis result to the display module.

15. A device for testing a camera in high and low temperature environments, comprising: a high and low temperature cabinet, a parallel light tube component, a test piece, a test box, a first positioning table, and a second positioning table, wherein a heating tube and a refrigerating tube of the high and low temperature cabinet are respectively connected to the test box, the test box is arranged on the first positioning table, the test piece is arranged in the parallel light tube component, the parallel light tube component is arranged on the second positioning table, and the parallel light tube component and the test box are arranged opposite to each other, wherein the test box comprises: a box body, a cover body, and a camera clamp, the box body and the cover body being arranged in a folding manner, and the camera clamp being arranged in the box body, and wherein a glass window is arranged on the cover body, and a heating wire is arranged at the glass window.

* * * * *